March 20, 1945.   D. W. MAIN ET AL   2,371,971
HOSE CONNECTOR
Filed April 26, 1943
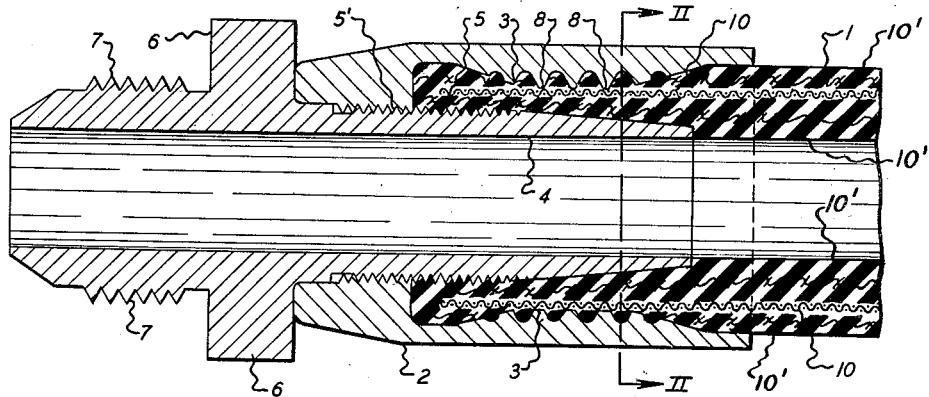
Fig.1
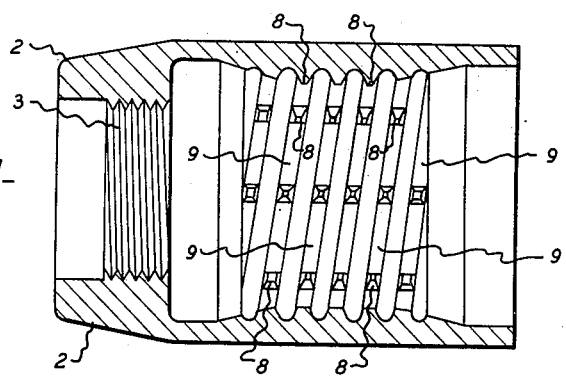
Fig.3
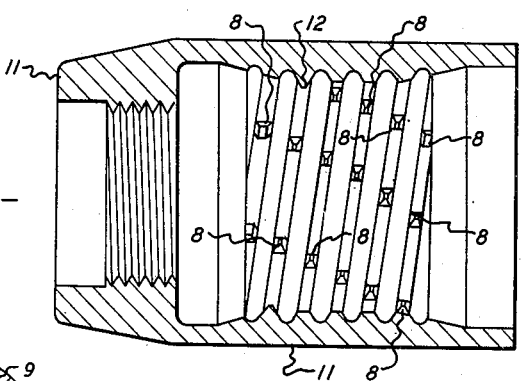
Fig.4
Fig.2
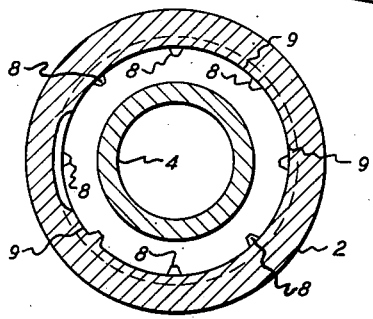
Inventors
DONALD W. MAIN
and ROBERT G. COX
By Beaman + Langyard
Attorneys Patented Mar. 20, 1945

2,371,971

UNITED STATES PATENT OFFICE 2,371,971

HOSE CONNECTOR

Donald W. Main and Robert G. Cox, Jackson, Mich., assignors to Michigan Patents Corporation, Jackson, Mich., a corporation of Michigan Application April 26, 1943, Serial No. 484,578

3 Claims. (Cl. 285—84)

The present invention relates to hose end connectors and fittings, and more particularly to an internal structure for restraining slippage of the hose, with respect to the connector or fitting, being especially suitable for detachable couplings for flexible hose.

Detachable couplings which do not require crimping or swagging at the factory for their assembly fail at pressures below the burst pressure of the hose due to inadequate gripping between the fitting and the hose. According to the present invention the interior of the fitting is so formed that there is localized penetration of portions of the fitting with one or more structural layers of the hose. For example, penetration may be through an outer rubber cover into the cotton layer or into a wire layer of a wire braided hose.

An object of the invention is to provide a hose connector socket having radially inwardly extending projections for engaging with the hose.

Another object of the invention is to provide a socket for hose connectors wherein there is provided an internal thread having a plurality of radially inwardly projecting points for engaging with the hose.

Another object of the invention is to provide a method of making sockets for hose connectors wherein a socket is provided having internal threads, and the threads have parts of the upper portions thereof broached or otherwise machined or formed to provide a plurality of projections for engaging with the hose.

Another object is to provide a hose fitting having a plurality of high compression points or zones which will engage with the body layer of the hose, as for example, the braid of wire braided hose or other reinforcing structure or layer.

These and other objects residing in the arrangement, combination and construction of the parts will be apparent from the following specification when taken with the accompanying drawing, in which Fig. 1 is a section through a hose having an end connector according to the present invention secured thereto, illustrating the hose engaging points and also the hose engaging threads at the interior of the socket, Fig. 2 is a vertical section on the line II—II of Fig. 1 showing the internal thread and the radially inwardly projecting points therein, the hose being omitted, Fig. 3 is a section of a socket of the character disclosed in Figs. 1 and 2, wherein the points are arranged in rows extending longitudinally in the sockets, and Fig. 4 is a section of a socket showing points arranged spirally.

Referring particularly to the drawing, the principles of the invention are illustrated in connection with a detachable hose fitting or connector, wherein 1 represents a flexible hose. Disposed over the end of the hose 1 is a socket 2. The socket 2 is provided with a portion having internal threads 3 so that the hose 1 may be threaded into the socket 2. The hose 1 is radially outwardly forced into engagement with the socket 2 by a nipple 4 having threads 5 and a threaded connection 5' with the socket 2. The nipple has as an integral part thereof a nut 6, and a connecting portion 7. The hose 1, the socket 2 and the nut 6 are assembled together by screwing the socket 2 onto one end of the hose 1 and screwing the nipple 4 into the socket 2. Thus the hose 1 is strongly compressed into engagement with the threaded portion 3 of the socket 2 to restrain the hose 1 from slipping from the socket 2.

In the illustration the threaded portion 3 of the socket 2 is broached longitudinally of its longitudinal aixs or otherwise machined to provide a plurality of points 8. As will be clear from Figs. 1, 2 and 3, points 8 extend in a series of rows in the direction of the longitudinal axis of the socket 2, and the channels 9 between the points 8, cut by the broach, cut through the thread 3 part way to the root thereof, although the cut could be extended to the depth of the thread if desired.

As the points 8 constitute a part of the original thread 3 of the socket 2, they extend helically along the path of the thread and thus minimize their interference when the socket 2 is threaded onto the end of the hose 1. The points 8 project into the hose 1 and since they are of small dimension laterally exert high unit pressures.

An important advantage of the present invention is realized in the association of the points 8 with wire braid hose. As shown the hose has a braided wire reinforcement 10. As the hose 1 is threaded into the socket 2, the points 8 slide over the surface of the hose 1 with a slight surface shuffling. When the nipple 4 is forced into the hose 1, the reinforcing 10 is forced into gripping contact with the penetration points 8 so that in order to pull the hose 1 from the socket 2 it is not only necessary to overcome the resistance offered by the outer braided cotton layer 10' into which the thread 3 is depressed, but also it is necessary to overcome the grip of the points 8 projecting into the reinforcing 10. The arrangement of the points 8 and the reinforcing 10 in an assembled end connector is such that actual deformation of the reinforcing 10 is required before the hose 1 can be pulled from the socket 2. Thus the invention not only consists of the provision of the points 8, but also consists of the relation between the points 8 and the reinforcing 10.

Another form of the invention is disclosed in Fig. 4 wherein the points 8, instead of being arranged in straight rows extending in the direction of the longitudinal axis of the sockets, are arranged spirally. Thus, in Fig. 4 is shown a socket 11 having a thread 12 therein which has been spirally broached to provide points 8 extending generally in the direction of the longitudinal axis of the socket 11 but are spirally disposed so that in the direction of longitudinal stress between the socket 11 and the hose with which it is connected, the points 8 are staggered.

Many other broaching arrangements will readily occur to those skilled in the art, as well as other methods and means of providing pressure areas. The arrangement of the pressure area or projection on a spiral has the advantage in detachable fittings of enabling the hose to be readily screwed into the socket by hand. Location of the projections upon concentrical rings or otherwise is nevertheless anticipated and will provide the desired results.

The hose 1 is of a construction extensively used in military aircraft for high pressure. The wire braid 10 is located between multiple layers of braided cotton 10' impregnated with synthetic rubber. When the principles of the present invention are applied to cotton braid hose without wire reinforcement, the projections penetrate into the layer of braided cotton to give added resistance against high pressure blowing the tube from the socket.

It should be understood from Fig. 1 that the compressive action of the nipple 4 forces the material of the hose into the root of the threads by deforming the outer surface of the hose. The broached portion of the threads offers shoulders resisting relative end movement along the deformed surface of the hose, while the projections 8 penetrate the body of the hose interlocking with the reinforcing wires, cords, threads, fabric or the like depending upon the body structure.

Having thus described our invention, what we desire to secure by Letters Patent and claim is:

1. A socket for hose end connectors of the character wherein an end of the hose is compressed in the socket and the connecting member of the connector is secured to the socket, which comprises a tubular member having an internal thread for threading the socket onto one end of a hose and for providing a plurality of antislipping edges, and a plurality of spaced points projecting radially inwardly from said thread to provide a series of relatively high unit pressures relatively against said hose.

2. A socket for flexible hose end fittings of the character wherein one end of the hose is compressed in the socket, which comprises opposed members between which the end of the flexible hose is adapted to be compressed and deformed, at least one of said members having an irregular surface for deforming a surface of said hose, and additional means associated with one of said opposed members for penetrating the body of said hose to interlock with the structure thereof.

3. Socket structure for flexible hose of the character described comprising opposed parts between which the hose is compressed to prevent endwise relative movement, one of said opposed members having a threaded surface for deforming a surface of the hose, and spaced hose penetrating areas integral with said threaded surface for penetrating the body of the hose deformed by said thread to interlock with the structure of the hose.

DONALD W. MAIN.
ROBERT G. COX.